(12) United States Patent
Spengler et al.

(10) Patent No.: US 12,521,660 B2
(45) Date of Patent: Jan. 13, 2026

(54) INTEGRATED MANIFOLD FOR PRE-CLEANER DUST REMOVAL

(71) Applicant: Caterpillar Inc., Peoria, IL (US)

(72) Inventors: Philip C. Spengler, Washington, IL (US); Timothy S. Finn, Morton, IL (US); Stephen Ellis Oedewaldt, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 345 days.

(21) Appl. No.: 18/139,767

(22) Filed: Apr. 26, 2023

(65) Prior Publication Data

US 2024/0359122 A1    Oct. 31, 2024

(51) Int. Cl.
| | |
|---|---|
| *B01D 45/16* | (2006.01) |
| *B01D 50/20* | (2022.01) |
| *B04C 3/04* | (2006.01) |
| *B04C 3/06* | (2006.01) |
| *B04C 9/00* | (2006.01) |
| *F02M 35/02* | (2006.01) |
| *F02M 35/024* | (2006.01) |
| *F02M 35/08* | (2006.01) |

(52) U.S. Cl.
CPC .............. *B01D 45/16* (2013.01); *B01D 50/20* (2022.01); *B04C 3/04* (2013.01); *B04C 3/06* (2013.01); *B04C 9/00* (2013.01); *F02M 35/0201* (2013.01); *F02M 35/02425* (2013.01); *F02M 35/084* (2013.01); *B04C 2009/002* (2013.01)

(58) Field of Classification Search
CPC .......... B01D 45/16; B01D 50/20; B04C 3/04; B04C 3/06; B04C 9/00; B04C 2009/002; F02M 35/0201; F02M 35/02425; F02M 35/084; F02M 35/0204; F02M 35/0223
See application file for complete search history.

(56) References Cited

U.S. PATENT DOCUMENTS

| | | | | |
|---|---|---|---|---|
| 2,662,610 A | * | 12/1953 | Heinrich | B04C 3/04 |
| | | | | 55/432 |
| 2,765,918 A | * | 10/1956 | Fontein | B04C 5/28 |
| | | | | 55/346 |
| 3,421,296 A | * | 1/1969 | Beurer, Sr. | F02C 7/052 |
| | | | | 55/306 |

(Continued)

FOREIGN PATENT DOCUMENTS

| | | |
|---|---|---|
| CN | 208934825 | 6/2019 |
| CN | 210660372 | 6/2020 |
| DE | 102014008701 | 11/2017 |

*Primary Examiner* — Dung H Bui (57) ABSTRACT

A pre-cleaner may include a plurality of spin tubes arranged side-by-side to form a row. Each spin tube may include a longitudinal axis, an inlet at a first end, and an outlet at a second end. The pre-cleaner may also include a manifold enveloping the outlets of the plurality of spin tubes and configured to receive and direct dust away from the outlets. The manifold may include a cover portion extending along and adjacent the row of spin tubes at a position along the longitudinal axis that is between the respective outlets and first ends of the spin tubes. The manifold may also include a trough extending along the row of spin tubes and defining a collection area that is arranged at a position along the longitudinal axis that is beyond the second ends of the spin tubes. A method of dust removal is also described.

19 Claims, 5 Drawing Sheets

(56) References Cited

U.S. PATENT DOCUMENTS

| | | | | |
|---|---|---|---|---|
| 3,469,566 | A * | 9/1969 | Wilkinson | F02M 35/022 55/467 |
| 3,520,114 | A * | 7/1970 | Gross | B04C 3/04 209/710 |
| 3,747,306 | A * | 7/1973 | Wikdahl | B04C 5/00 55/459.1 |
| 3,989,628 | A * | 11/1976 | Bier | B01D 35/20 210/255 |
| 4,050,913 | A * | 9/1977 | Roach | B01D 50/20 96/381 |
| 4,162,905 | A | 7/1979 | Schuler | |
| 4,242,115 | A * | 12/1980 | Harold | B01D 45/16 55/347 |
| 4,539,105 | A * | 9/1985 | Metcalf | B04C 5/18 156/84 |
| 4,591,367 | A * | 5/1986 | Pek | B01D 45/12 55/347 |
| 4,746,340 | A * | 5/1988 | Durre | B01D 45/12 55/347 |
| 5,388,708 | A * | 2/1995 | Bouchillon | B04C 5/28 209/734 |
| 5,690,709 | A * | 11/1997 | Barnes | B04C 3/04 55/318 |
| 6,884,273 | B2 * | 4/2005 | Kopec | B04C 3/04 55/346 |
| 8,657,903 | B2 * | 2/2014 | Menssen | F02M 35/0223 55/504 |
| 2006/0096455 | A1 * | 5/2006 | Couch | B01D 45/16 95/269 |
| 2008/0086989 | A1 * | 4/2008 | Sheidler | F02M 35/022 55/345 |
| 2010/0267540 | A1 * | 10/2010 | Babb | B01D 45/16 494/59 |
| 2010/0275561 | A1 * | 11/2010 | Lundquist | B04C 3/06 524/570 |
| 2013/0152525 | A1 * | 6/2013 | Brandner | B04C 3/06 137/15.01 |
| 2016/0243479 | A1 * | 8/2016 | Gossez | F02M 35/088 |
| 2016/0305375 | A1 * | 10/2016 | Finn | B01D 46/0002 |
| 2019/0099766 | A1 * | 4/2019 | Krishnamurthy | B04C 9/00 |
| 2019/0111374 | A1 * | 4/2019 | Burton | B01D 46/0005 |
| 2019/0277227 | A1 | 9/2019 | Larson | |
| 2020/0009487 | A1 * | 1/2020 | Vanaudenhove | F02M 35/10262 |
| 2020/0030821 | A1 * | 1/2020 | Ruhland | B01D 46/0012 |
| 2020/0368664 | A1 | 11/2020 | Koeger et al. | |
| 2021/0017939 | A1 * | 1/2021 | Koeger | B01D 45/16 |
| 2021/0039030 | A1 | 2/2021 | Spengler et al. | |
| 2022/0252028 | A1 | 8/2022 | Rajendran et al. | |
| 2022/0288518 | A1 * | 9/2022 | Hosur | B01D 46/0046 |

* cited by examiner

INTEGRATED MANIFOLD FOR PRE-CLEANER DUST REMOVAL

TECHNICAL FIELD

The present application related to pre-cleaners for work machines, such as engines or motors in a vehicle, vacuum, or other machine. More particularly, the present application relates to a manifold of the pre-cleaner that receives and directs dust away from outlets of a plurality of spin tubes. Still more particularly, the present application relates to a manifold design that is particularly efficient at dust and dirt removal.

BACKGROUND

Engines on work machines receive air through an air intake. Engines can include a filter prior to the air intake to remove dirt and dust. The filter can include a fibrous or porous material to remove solid particles from the air. The solid particles can include dust, pollen, mold, and bacteria. The work machine can include a pre-cleaner positioned prior to the filter to provide additional dirt and dust removal before air enters the filter. This can be useful to prolong the operational life of the filter, for example, by removing larger particles and preventing the same from quickly clogging the filter.

U.S. Pat. No. 4,162,905 relates to an air intake filter with cyclone separator stage. Chinese Patent Application 210660372 relates to an air filter and prefilter thereof. The cyclone comprises a cyclone pipe and an annular frame, wherein the cyclone pipes are arranged in a honeycomb shape. The dust collecting plate is arranged below the cyclone pipes.

SUMMARY

In one or more examples, a pre-cleaner may include a plurality of spin tubes arranged side-by-side to form a row. Each spin tube may include a longitudinal axis, an inlet at a first end, and an outlet at a second end. The pre-cleaner may also include a manifold enveloping the outlets of the plurality of spin tubes and configured to receive and direct dust away from the outlets. The manifold may include a cover portion extending along and adjacent the row of spin tubes at a position along the longitudinal axis that is between the respective outlets and first ends of the spin tubes. The manifold may also include a trough extending along the row of spin tubes and defining a collection area that is arranged at a position along the longitudinal axis that is beyond the second ends of the spin tubes.

In one or more other examples, a method of dust removal may include directing a plurality of dust particles into a plurality of spin tubes arranged side-by-side to form a row, wherein the plurality of spin tubes are configured to receive the plurality of dust particles through an inlet at a first end. The method may also include directing the plurality of dust particles to an outlet of each of the plurality of spin tubes, wherein the outlet is arranged at a second end. The method may also include directing the plurality of dust particles through the outlets of the plurality of spin tubes into a manifold of the pre-cleaner, wherein a cover portion of the manifold is adjacent the row of spin tubes at a position between the respective outlets and first ends of the spin tubes. The method may also include directing the plurality of dust particles into a trough of a manifold using the cover portion of the manifold, wherein the trough is beyond the second ends of the spin tubes. The method may also include removing the plurality of dust particles through a scavenge tube of the pre-cleaner, wherein the scavenge tube is coupled to the trough of the manifold.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
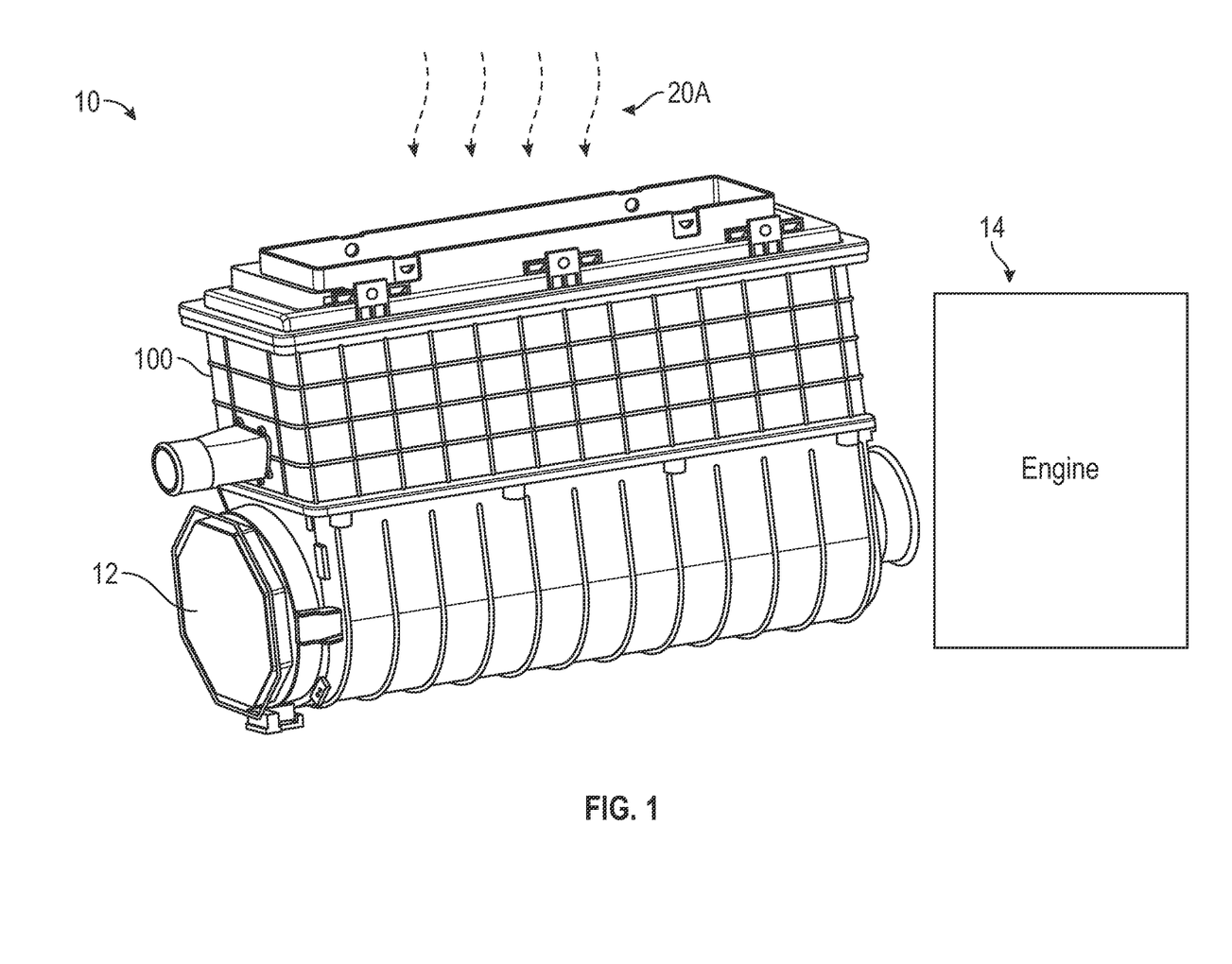
FIG. 1 is a perspective view of a work machine having an air filtration system, according to one or more examples.

FIG. 1 is a perspective view of an air filtration system suitable for use with a work machine. The air filtration system may be configured to treat air from around the work machine to make it suitable for use in combustion processes within the engine. While not shown, work machines may include equipment such as loaders, excavators, haul trucks, crawlers, rotary mixers, pavers, milling machines, and other types of machines adapted to perform work and may also include stationary engines such as generators and the like. These machines may include a frame with a combustion engine arranged thereon to provide power to the work machine, which may be used to operate a motive system such as a tracked or wheeled system. The combustion engine may also provide rotational power to a hydraulic system for operating an implement of the work machine. The work machine may include an electronic control module for receiving inputs from an onboard or remote operator to operate the motive system and/or the hydraulic system. As shown, the air filtration system may be arranged adjacent to and fluidly coupled to a combustion engine on the work machine and may function to clean the air entering the combustion engine. While the present air filtration system and pre-cleaner thereof has been described in conjunction with a work machine, the system may be suitable for use with any combustion engine arranged on any type of equipment.

With continued reference to FIG. 1, as mentioned, the work machine may include an air filtration system 10 configured as a whole to treat air for combustion. This may include receiving or drawing in outside ambient air from around a work machine and removing dust, debris, and other particles from the air to provide clean air to the engine for combustion. The air filtration system 10 may include a pre-cleaner 100 and a filter 12 and the system 10 may be arranged in fluid communication with the engine 14 of a work machine. The present improvements in the air filtration system relate primarily to the pre-cleaner 100, which will be described in further detail in FIGS. 2-5.

Figure 2:
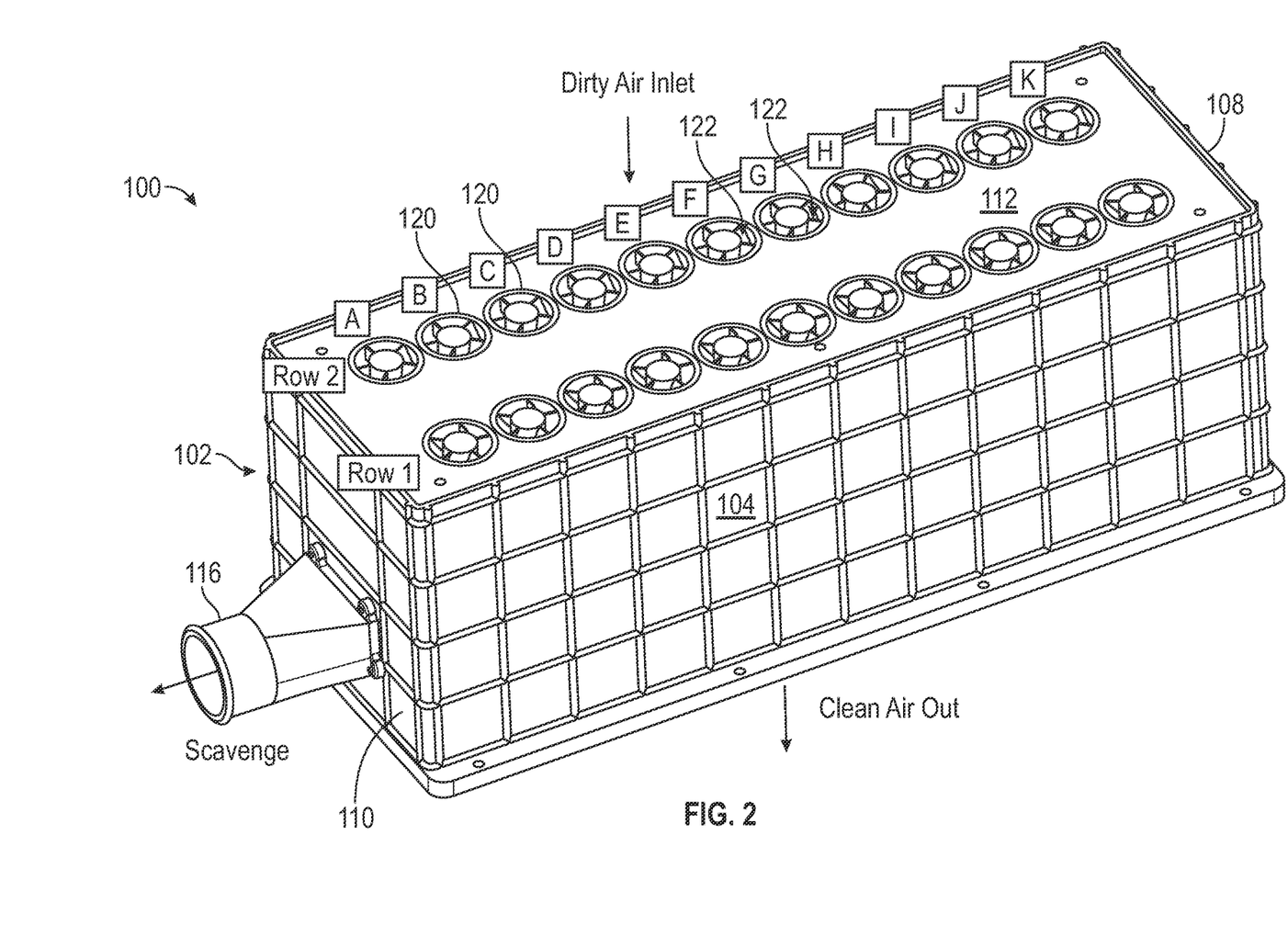
FIG. 2 is a perspective front/top/side view of a pre-cleaner of the air filtration system of FIG. 1, according to one or more examples.
Figure 3:
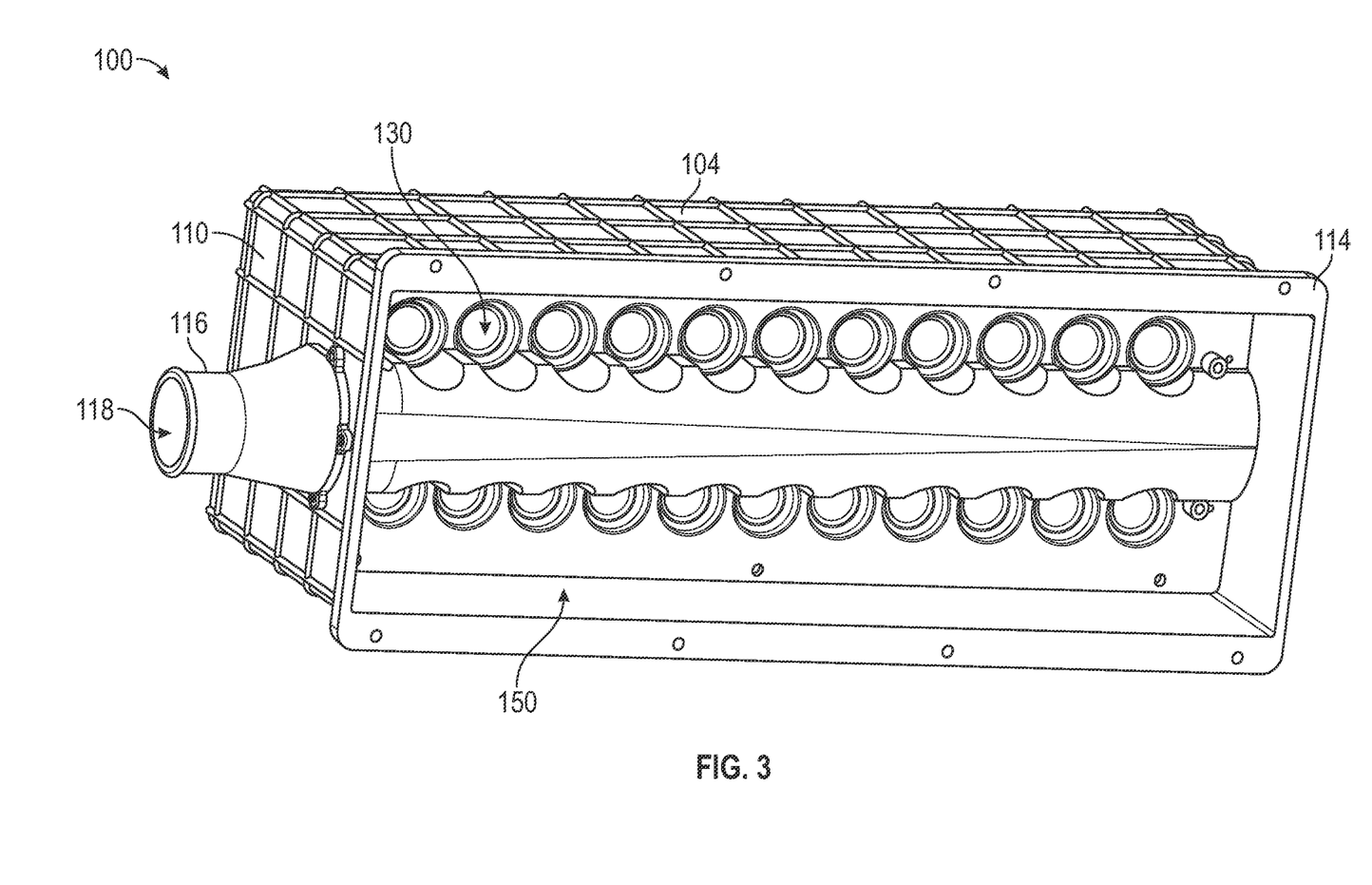
FIG. 3 is a front/bottom/side perspective view of the pre-cleaner of FIG. 2, according to one or more examples.

Referring now to FIGS. 2 and 3, one example of pre-cleaner 100 is shown. The pre-cleaner 100 may be configured to pre-clean the incoming air without the use of a filter media. For example, the pre-cleaner 100 may, instead, use particular air flow techniques to separate dust, debris and other particles from the air flow and then divert the air flow to the air filter and direct the dust, debris, and other particles elsewhere. The pre-cleaner 100 may include a body 102, a plurality of spin tubes 120, and a manifold 136.

The body 102 may be configured to receive or draw in outside ambient air, house the components that perform the filtering operation without the use of a filter media, physically couple the pre-cleaner to an air filter, and fluidly couple the pre-cleaner to an air filter to allow pre-cleaner air to move from the pre-cleaner 100 to an air filter. The body 102 may define an inlet, two outlets, and a filter mechanism arranged between the inlet and the outlets. With reference to FIG. 2, the body 102 may be a rectangular prism, defining a first longitudinal side 104, a second longitudinal side (not shown, but opposite side 104), a first end 108, a second end 110, a first lateral side 112, and a second lateral side 114 (see FIG. 3, the side opposite 112). The first longitudinal side 104 and the second longitudinal side may be parallel and extend between the first end 108 and the second end 110. The first lateral side 112 and the second lateral side 114 may be parallel and extend between the first end 108 and the second end 110. The first end 108 and the second end 110 may be parallel. Alternatively, the body 102 may be cylindrical, defining sides corresponding to the first lateral side 112 and the second lateral side 114, and a cylindrical wall extending therebetween. While a rectangular body 102 and a cylindrical body have been described, still other shapes such as square, toroidal, triangular, or still other shapes may be provided.

The plurality of spin tubes 120 may be arranged in or on the body and may be configured to separate dust from incoming air by creating cyclonic motion of the air to separate particulate from the air. The spin tubes 120 may each include an inlet 122 that, together, may define the inlet of the overall body 102. The inlets 122 of the spin tubes may be on the first lateral side 112 of the body 102. The inlets 122 may be in substantial direct fluid communication with outside ambient air. The plurality of spin tubes 120 may be aligned in a row or several rows of spin tubes 120 may be provided. The rows of spin tubes 120 may extend parallel to the first longitudinal side 104 between the first end 108 and the second end 110. While shown as straight rows, the rows of spin tubes 120 may be curved such as in a toroidal or cylindrical body 102 where the rows may follow a curvature of the sidewall of the body 102. A row of spin tubes 120 may include at least two spin tubes 120 and/or the number of spin tubes may be selected depending on the airflow moving through the precleaner.

The spin tubes 120 define the inlets 122 at a first end of the spin tube 120. The first end of the spin tube 120 may be flush with the first lateral side 112 of the pre-cleaner body 102. The first end of the spin tube 120 may be recessed into the first lateral side 112. In yet another example, the first end of the spin tube 120 may protrude from the first lateral side 112. For example, if any of the first longitudinal side 104, the second longitudinal side, the first end 108, and/or the second end 110 extend beyond the first lateral side 112, the first end of the spin tubes 120 can protrude from the first lateral side 112 a substantially similar amount.

The inlets 122 may be in substantial direct fluid communication with two outlets of the pre-cleaner 100: a first outlet for pre-cleaned air, and a second outlet for dirt and dust. The first outlet may be a pre-cleaned air outlet 130 (see FIG. 3) of each of the spin tubes 120. The outlets 130 may be at a second end of the spin tubes 120. The second end may positioned laterally from the first end, along a longitudinal axis of the spin tubes 120. The second end may extend laterally at a height smaller than a height of the first longitudinal side. The spin tube air outlets 130 are in substantial direct fluid communication to the spin tube inlets 122 via a channel (shown in FIGS. 4 and 5). The outlets are in fluid communication with a cavity 150 of the pre-cleaner 100 defined by the second lateral side 114, the first end 108, the second end 110, the first longitudinal side 104, and a second longitudinal side.

Figure 5:
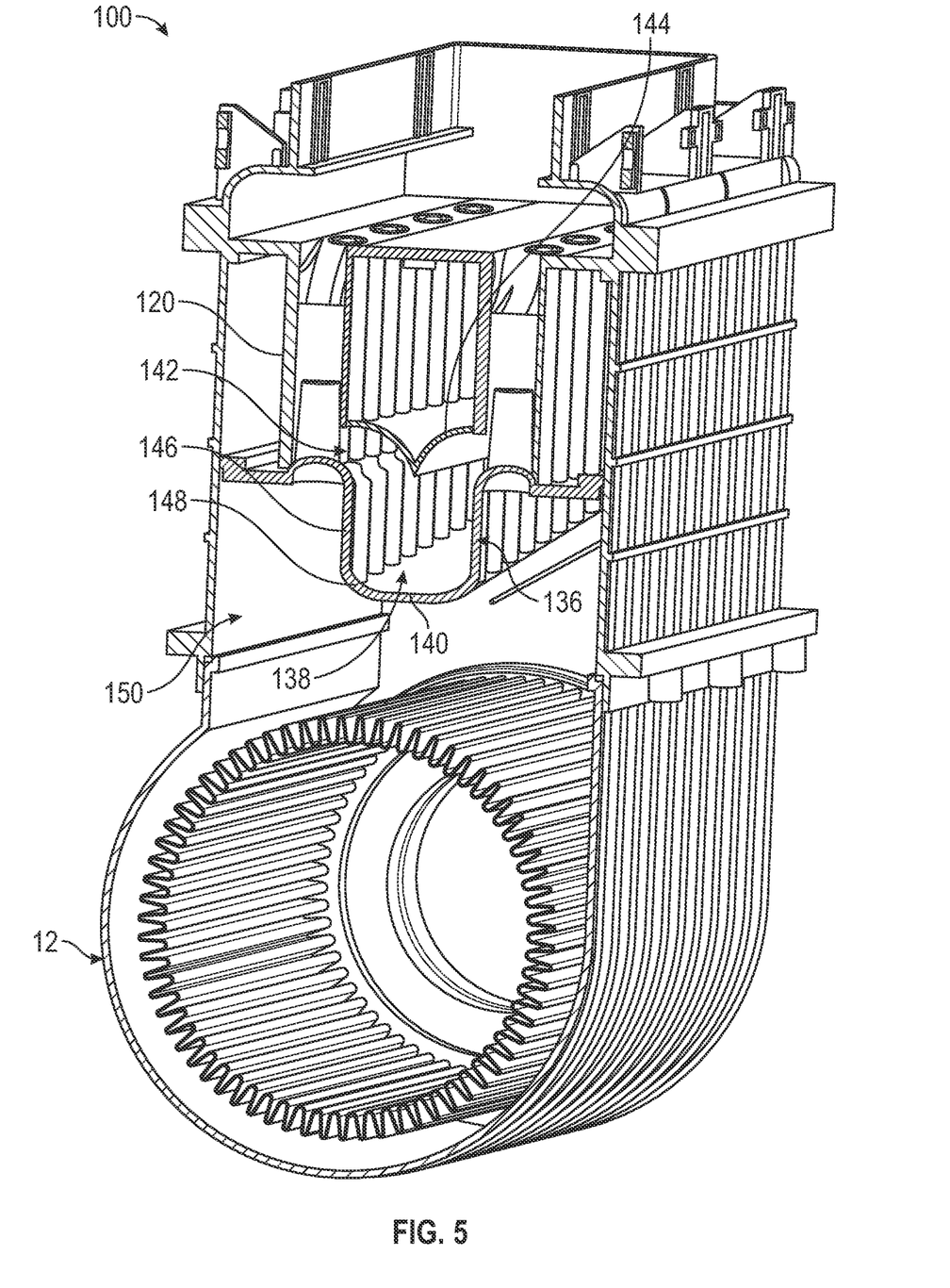
FIG. 5 is a lateral cross-sectional view thereof and including a lateral cross-section of a filter media portion of the air filtration system.

As shown in FIG. 5, the second lateral side 114 may secure the pre-cleaner body 102 to a filter, and cavity 150 may allow air to flow between the pre-cleaner 100 and a filter (e.g., filter 12), such that the cavity 150, and more specifically the outlets 130, are in substantial direct fluid communication with the filter. the second lateral side 114 may be primarily an edge along the first end 108, the second end 110, the first longitudinal side 104, and the second longitudinal side to facilitate coupling between the body 102 and the filter while maintaining ample fluid flow.

The second outlet may be a dirt and dust outlet 142. The second outlet may deliver dust to a channel 118 defined by a scavenge tube 116. The scavenge tube 116 may extend longitudinally from the second end 110. The scavenge tube 116 may be in fluid communication with the spin tube inlets 122, and Scavenge tube 116 may be coupled to a pump, such as a vacuum pump, that directs a portion of the airflow, which includes the dirt and dust, through the channel 118 and out of the pre-cleaner 100.

Figure 4:
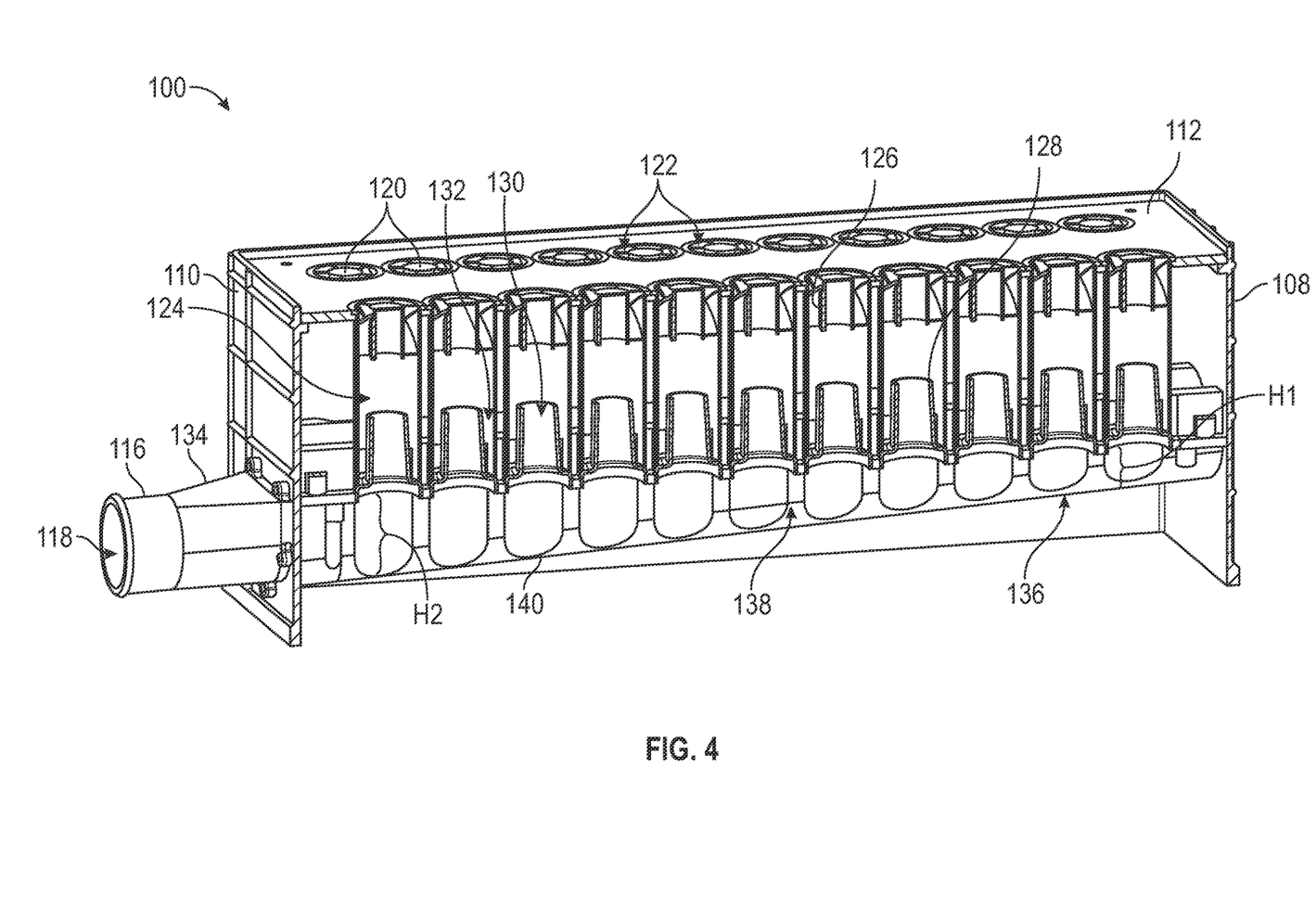
FIG. 4 is a longitudinal cross-sectional view thereof.

Turning now to FIG. 4, a longitudinal cross-sectional view of the pre-cleaner 100 is shown, taken through one of the rows of spin tubes 120. The spin tubes 120 may each define a cylindrical channel 124 extending from the first end to the second end of the spin tubes 120. The channel 124 may fluidly couple the inlet 122, the pre-cleaned air outlet 130, and a dirt and dust channel 132. The spin tubes 120 may each include a fin 126 proximal the first end of the spin tubes 120 near the spin tube inlet 122. The fin 126 may be configured to separate dirt and dust from the airflow, directing the dirt and dust to the dirt and dust channel 132 of the spin tube 120. For example, the fin 126 may be auger-shaped to cause rotation of the airflow to separate dirt and dust from the airflow. That is, the fin 126 may induce rotation in the air due to air flowing through the spin tubes 120 and passing through the fin 126. Accordingly, the spin tubes 120 may filter air by directing dirt and dust to the dirt and dust channel 132 and pre-cleaned air to the pre-cleaned air outlet 130. The pre-cleaned air outlet 130 may direct air to the filter, or other components following the pre-cleaner 100, such as the air filter 12 or an engine.

The spin tubes 120 define an internal wall 128. The internal wall 128 separates the pre-cleaned air outlet 130 and the dirt and dust channel 132 within the spin tubes 120. The internal wall 128 is cylindrical and extends longitudinally from the second end of spin tubes 120 a portion of the way through the spin tubes 120, leaving a space between the outer wall of the spin tube 120 and the internal wall 128. The pre-cleaned air outlet 130 may be internal to the internal wall 128, and the dirt and dust channel 132 may be between the internal wall 128 and the spin tube outer wall. Such a configuration allows separation of dust, debris and other particles from the air flow by diverting the pre-cleaned air flow directly through the spin tubes 120 and directing the dust, debris, and other particles against the outer wall of the spin tubes 120.

The dirt and dust channel 132 may be in fluid communication with a manifold 136 via a dirt and dust outlet 142 of the spin tubes 120 (shown in FIG. 5). The manifold 136 may extend longitudinally between the first end 108 and the second end 110 of the body 102. The manifold 136 may define a trough 140 extending from the first end 108 to the second end 110 of the body 102. The trough 140 may define a collection area 138 that is arranged at a position along the longitudinal axis of the spin tubes 120 that is beyond the second ends of the spin tubes 120. The collection area 138 may be in direct fluid communication with the dirt and dust outlet 142 of the spin tubes 120 such that dirt and dust may be directed away from the spin tubes 120, aiding in removal of dirt and dust from the pre-cleaner.

The collection area 138 may include a first height H1 at the first end 108 and a second height H2 at the second end 110. The first height H1 may be smaller than the second height H2. Accordingly, the manifold trough 140 may taper from the second end 110 to the first end 108. As air flows into the manifold 136 and the collection area 138 from a spin tube 120, the height of the collection area 138 may create a velocity in the collection area 138 corresponding to the height of the collection area 138 at the outlet 130 of the specific spin tube 120. The first height H1 may create a first velocity, and the second height may create a second velocity. The first velocity may be higher than the second velocity. A higher velocity at the first end 110 may increase air flow toward the scavenge tube 116, which may aid in dirt and dust removal from the manifold 136. Such a configuration may also reduce build up in the collection area 138, particularly near the first end 108 of the pre-cleaner 100.

The manifold 136 may be physically coupled to the scavenge tube 116 at the second end 110. In addition, the channel 118 of the scavenge tube 116 may be in substantial direct fluid communication with the collection area 138. The scavenge tube 116, which may be coupled to a pump, may aid in removal of dirt and dust from the manifold 136. A height, width, and/or diameter of the manifold 136 may be larger than the scavenge tube 116. The scavenge tube 116 may include a taper 134 to aid in directing the dirt and dust from the manifold 136 through the scavenge tube channel 118 due to differences in sizes of the manifold 136 and the scavenge tube 116. The taper 134 of the scavenge tube 116 may reduce buildup of dirt and dust in a transition area between the collection area 138 of the manifold 136 and the scavenge tube channel 118.

Turning now to FIG. 5, a lateral cross-sectional view of the air filtration system is shown. The air filtration system includes the pre-cleaner 100 and the filter 12. a filter media portion of the air filtration system. The pre-cleaner 100 may be coupled to the filter 12 along the second lateral side 114. The cavity 150 defined by the pre-cleaner 100 may be in substantial direct fluid communication with an inlet of the filter 12.

The trough 140 of the manifold 136 may extend along the row of spin tubes 120 at a position along the longitudinal axis of the spin tubes 120 that is beyond the second ends of the spin tubes 120. The trough 140 may define walls 146 to define the collection area 138. To reduce buildup of dirt and dust, a corner 148 of the trough 140 and wall 148 may be rounded. With a rounded corner 148, air flow may circulate in the corner 148 to more effectively to reduce the potential for buildup of dirt and dust in the collection area 138.

The manifold 136 may be positioned laterally between the rows of spin tubes 120. The manifold 136 may include a cover portion 144. The cover portion 144 may extend along the longitudinal axis of the pre-cleaner body 102 from the first end 108 to the second end 110 of the pre-cleaner body 102. The cover portion 144 may extend laterally adjacent the row of spin tubes 120 at a position along the longitudinal axis of the spin tubes 120 that is between dirt and dust outlets 142 of the spin tubes 120 and the first ends of the spin tubes 120. The dirt and dust outlets 142 may be in substantial direct fluid communication with the dirt and dust channel 132 of the spin tubes 120. The dirt and dust outlets 142 may be in substantial direct fluid communication with the manifold 136, and more specifically, the collection area 138. The manifold 136 may envelop the outlets 142 of the plurality of spin tubes 120 to direct most of the dirt and dust from the spin tubes 120 into the collection area 138 of the manifold 136. The outlets 142 may be a continuous opening along the longitudinal axis of the pre-cleaner 100 at manifold 136. Alternatively, each spin tube 120 may define an individual outlet 142 in substantial direct fluid communication with the collection area 138 of the manifold 136. As shown, the outlet 142 may extend laterally out a side of the spin tube and into the manifold 136.

The cover portion 144 of the manifold 136 may extend laterally between the rows of spin tubes 120. The cover portion 144 may taper toward a center longitudinal axis of the manifold 136. That is, the cover may form a general v-shape as shown, which may aid with directing air flow, and therefore dirt and dust, into the collection area 138 of the manifold 136. Each tapered side of the cover portion 144 may also be rounded and concave down (convex up) from the collection area 138 of the manifold 136. By rounding each side of the cover portion 144, the air flow channel created by the cover portion 144 may remain substantially consistent to maintain smooth air flow and direct the dirt/dust flow. The rounded and tapered portions of the cover portion 144 may create two air flows in the collection area 138 of the manifold 136 (e.g., one from each side), and may generate rotation of the air flow about two generally horizontally extending axes such that build up in the collection area 138 is reduced. For example, build up may be reduced in the corners of the collection area 138 of the manifold 136.

The air filter 12 may be configured to receive pre-cleaned air from the pre-cleaner 100 and perform a filtering operation. That is, the air filter may have housing defining an inlet, and outlet, and a filter region arranged between the inlet and the outlet. The inlet may be in substantial direct fluid communication with the cavity 150 of the pre-cleaner 100. The outlet may be in substantial direct fluid communication with an air inlet of an engine. The filter region may define a cavity for receiving filter media. In some examples, the filter media may be in the form of a replaceable cartridge, which may be a rectangular, cylindrical, toroidal, or other shape. The cartridge may include filter media such as a membrane with a fine porosity allowing air to pass through the filter media while capturing dust and particles. The filter media may be arranged in folded fashion in the cartridge so as to increase the surface area through which the air may flow and, thus, reduce the restriction on air flow through the filter.

INDUSTRIAL APPLICABILITY

In operation and in use, the pre-cleaner may provide for efficient cleaning of air. That is, a pre-cleaner positioned in a filtration system, prior to a filter media, cleans the air by removing dirt and dust before the air enters the filter and engine of the work machine. That is, the pre-cleaner may include a manifold that efficiently receives and directs dust away from outlets of a plurality of spin tubes of the pre-cleaner. By efficiently receiving and directing dust away from the outlets of the spin tubes, clogging and build up is reduced, increasing efficiency. That is, by increasing efficiency and decreasing build up, costs are reduced as replacement of parts is required less frequently and thus have a longer life span.

A method of dust removal may include directing air into an inlet of the pre-cleaner, where the air includes dust. The inlet may be at a first end of a plurality of spin tubes arranged in side-by-side rows. The air may be directed through the plurality of spin tubes to a first outlet of the spin tubes at a second end of the spin tubes lateral the first end. In moving through the spin tubes, dust may be separated and directed to a second outlet at the second end of the spin tubes. The second outlet may be coupled to a manifold. That is, the manifold may be adjacent the rows of spin tubes at a position between the first end and a second end and extend beyond the second end of the spin tubes. That is, the manifold may define a trough beyond the second end of the spin tubes.

The method may include directing dust into the manifold using a cover portion of the manifold that extends between the rows of spin tubes. The air may be directed by an inward taper of the cover portion of the manifold. The inward taper may be curved to aid with directing the air into the trough of the manifold.

The method may include removing dust from the manifold through a scavenge tube in substantial direct fluid communication with the trough of the manifold. The trough may include a taper such that a height of the trough at an end proximal the scavenge tube is greater than a height distal the scavenge tube. That is, when the scavenge tube removes dust from the manifold, a larger velocity may be generated at the distal end and a smaller velocity may be generated at a proximal end. That is, the manifold may not clog as readily due to the higher velocity at the distal end.

After moving through the pre-cleaner, the pre-cleaned air may enter a filter. The filter may remove solid particles from the air as it passes through a filter media in the filter. The air may then flow into an engine. As the air has passed through the pre-cleaner and the filter, the air may be substantially clean prior to entering the engine. Accordingly, the engine may have a longer life span and operate at a higher efficiency with lower costs. The pre-cleaner may clean the air sufficiently such that the filter between the pre-cleaner and the engine may be eliminated.

The above detailed description is intended to be illustrative, and not restrictive. The scope of the disclosure should, therefore, be determined with references to the appended claims, along with the full scope of equivalents to which such claims are entitled.

What is claimed is:

1. A pre-cleaner, comprising:
    a body having a planar side;
    a plurality of spin tubes arranged side-by-side to form a straight row extending longitudinally along the body, each spin tube having a longitudinal axis extending orthogonal to the row, an inlet at a first end and arranged flush with the planar side, and a dust outlet at a second end;
    a manifold enveloping the dust outlets of the plurality of spin tubes and configured to receive and direct dust away from the outlets, the manifold comprising:
        a cover portion extending along and adjacent the straight row of spin tubes at a position along the longitudinal axis that is between the respective dust outlets and first ends of the spin tubes; and
        a trough extending along the row of spin tubes and defining a collection area that is arranged at a position along the longitudinal axis that is beyond the second ends of the spin tubes.

2. The pre-cleaner of claim 1, wherein the cover portion of the manifold comprises an inward taper towards a center axis of the manifold.

3. The pre-cleaner of claim 2, wherein the inward taper is rounded outward from the collection area of the manifold.

4. The pre-cleaner of claim 2, wherein the inward taper is configured to direct dust to the trough of the manifold.

5. The pre-cleaner of claim 1, wherein the trough of the manifold tapers along the longitudinal axis, such that a first height of the collection area at a first longitudinal position is less than a second height of the collection area at a second longitudinal position of the pre-cleaner.

6. The pre-cleaner of claim 5, wherein the first height of the collection area is configured to generate a higher velocity and the second height of the collection area is configured to generate a lower velocity.

7. The pre-cleaner of claim 1, wherein the manifold is coupled to a scavenge tube.

8. The pre-cleaner of claim 1, wherein the trough comprises rounded corners.

9. A work machine comprising:
    the pre-cleaner of claim 1;
    a filter media; and
    an engine, wherein the filter media is positioned between the pre-cleaner and the engine.

10. A method of dust removal using a pre-cleaner having a body with a planar side, the method comprising:
    directing a plurality of dust particles into a plurality of spin tubes arranged side-by-side to form a straight row extending longitudinally along the body, each spin tube having a longitudinal axis extending orthogonal to the row, wherein the plurality of spin tubes are configured to receive the plurality of dust particles through an inlet at a first end arranged flush with the planar side of the body;
    direct the plurality of dust particles to a dust outlet of each of the plurality of spin tubes, wherein the dust outlet is arranged at a second end;
    directing the plurality of dust particles through the dust outlets of the plurality of spin tubes into a manifold of the pre-cleaner, wherein a cover portion of the manifold is adjacent the row of spin tubes at a position between the respective outlets and first ends of the spin tubes;
    directing the plurality of dust particles into a trough of a manifold using the cover portion of the manifold, wherein the trough extends along the row of spin tubes and defines a collection area that is arranged at a position along the longitudinal axis that is beyond the second ends of the spin tubes;
    removing the plurality of dust particles through a scavenge tube of the pre-cleaner, wherein the scavenge tube is coupled to the trough of the manifold.

11. The method of dust removal of claim 10, wherein directing the plurality of dust particles into the trough of the manifold comprises directing the plurality of dust particles into the trough using an inward taper of the cover portion of the manifold.

12. The method of dust removal of claim 10, wherein removing the plurality of dust particles through the scavenge tube of the pre-cleaner comprises generating a higher velocity at a first end of the trough of the manifold, wherein the first end of the trough is distal to the scavenge tube.

13. The method of claim 12, wherein the cover portion of the manifold comprises an inward taper towards a center axis of the manifold.

14. The method of claim 13, wherein the inward taper is rounded concave up or outward from the collection area of the manifold.

15. The method of claim 13, wherein the inward taper is configured to direct dust to the trough of the manifold.

16. The method of claim 12, wherein the trough of the manifold tapers along a longitudinal axis thereof, such that a first height of the collection area at the first end is less than a second height of the collection area at a second end.

17. The method of claim 16, wherein the first height of the collection area is configured to generate the higher velocity and the second height of the collection area is configured to generate a lower velocity.

18. The method of 10, wherein the manifold is coupled to the scavenge tube.

19. The method of claim 10, wherein the trough comprises rounded corners.

* * * * *